(12) United States Patent
Bell, Jr. et al.

(10) Patent No.: US 8,352,712 B2
(45) Date of Patent: Jan. 8, 2013

(54) METHOD AND SYSTEM FOR SPECUALTIVELY SENDING PROCESSOR-ISSUED STORE OPERATIONS TO A STORE QUEUE WITH FULL SIGNAL ASSERTED

(75) Inventors: Robert H. Bell, Jr., Austin, TX (US); Thomas Michael Capasso, Austin, TX (US); Guy Lynn Guthrie, Austin, TX (US); Hugh Shen, Austin, TX (US); Jeffrey Adam Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2558 days.

(21) Appl. No.: 10/840,560

(22) Filed: May 6, 2004

(65) Prior Publication Data

US 2005/0251660 A1    Nov. 10, 2005

(51) Int. Cl.
*G06F 9/30* (2006.01)
(52) U.S. Cl. ........................................ 712/225
(58) Field of Classification Search ................... 712/225
See application file for complete search history.

(56) References Cited

U.S. PATENT DOCUMENTS 5,023,776 A * 6/1991 Gregor ........................... 711/122

OTHER PUBLICATIONS

Park et al. "Reducing Design Complexity of the Load/Store Queue". Proceedinggs of the 36th International Symposium on Microarchitecture, Dec. 2003.*
Raasch et al. "A Scalable Instruction Queue Design Using Dependence Chains". May, 2002. pp. 318-329.*
Hamacher, Carl. Vranesic, Zvonko. Zaky, Safwat. "Computer Organization". McGraw-Hill, 5th Edition, 2002. p. 705.*

* cited by examiner

*Primary Examiner* — Robert Fennema
(74) *Attorney, Agent, or Firm* — Yudell Isidore Ng Russell PLLC

(57) ABSTRACT

A method and processor chip design for enabling a processor core to continue sending store operations speculatively to the store queue after the core receives indication that the store queue is full. The processor core is configured with speculative store logic that enables the processor core to continue issuing store operations while the store queue full signal is asserted. A copy of the speculatively issued store operation is placed within a speculative store buffer. The core waits for a signal from the store queue indicating the store operation was accepted into the store queue. When the speculatively-issued store operation is accepted within the store queue, the copy is discarded from the buffer. However, when the store operation is rejected, the speculative store logic re-issues the store operation ahead of normal store operations.

28 Claims, 9 Drawing Sheets

METHOD AND SYSTEM FOR SPECUALTIVELY SENDING PROCESSOR-ISSUED STORE OPERATIONS TO A STORE QUEUE WITH FULL SIGNAL ASSERTED

BACKGROUND OF THE INVENTION

1. Technical Field

The present invention relates generally to processor chips and specifically to processing store operations within a processor chip. Still more particularly, the present invention relates to speculative issuance of store operations to a store queue within a processor chip.

2. Description of the Related Art

Increasing efficiency of data operations at the processor-cache level is an important aspect of processor chip development. Modern microprocessors typically contain entire storage hierarchies (caches) integrated onto a single integrated circuit. For example, one or more processor cores containing L1 instruction and/or data caches are often combined with a shared on-chip L2 cache.

In systems with on-chip caches, processor-issued data store operations typically target only a small portion (i.e., 1-byte to 16-bytes) of a cache line compared to the entire cache line (e.g., typically 128-bytes). For example, it is possible for a processor-issued store operation to target only a single byte granule of a 128-byte cache line to update, and cache line updates are completed via a combination of these individual store operations, which may occur sequentially. In order to increase efficiency, processor chips are often designed with a "store queue" that is typically placed between a processor core and the L2 cache. A store queue typically contains byte-addressable storage for a number of cache lines (usually 8 to 16 cache lines).

FIG. 2A illustrates a prior art representation of specific hardware and logic components of a processor chip that are utilized to complete data store operations. As illustrated, processor chip 201 includes a processor core 203 and store queue mechanism 240, which includes store queue 207 and store queue (STQ) controller 205. RC mechanism 225 includes RC dispatch logic 219 and associated RC machines 221. STQ controller 205 includes arbitration logic 206 utilized for selecting entries from the store queue 207, as described below. RC dispatch logic 219 supports a series of RC machines 221, which complete the actual data store operations at the lower-level cache (not shown).

The store queue 207 provides several rows (entries) for temporarily storing and tracking processor-issued stores. Each row is divided into several columns that provide byte enable register 209, address register 211, data register 213, controls bits 215, and valid bit 217. Data register 213 and address register 211 store data issued from the processor core 203 and the corresponding data (memory) address, respectively. Byte enable register 209 includes a number of bookkeeping bits. Conventionally, the number of bits corresponds to the number of individually addressable storage granules within a cache line. Thus, for example, for a 128-byte cache line and byte-size store operations, byte enable register 209 maintains 128 bits for tracking single-byte processor-issued stores within the entry (i.e., a buffer that temporarily holds data of one or more store operations that update the same target cache line). This enables tracking of specific bytes (or group of bytes) within a 128-byte cache line entry that is being updated by the processor.

Valid bit 217 indicates to STQ controller 205 when data within a particular row of the store queue 207 is valid, and valid bit 217 is checked before arbitration logic 206 selects a row of data (or an entry) to forward to RC Dispatch logic 219. Once a valid bit is set, arbitration logic 206 is able to select the entry regardless of whether additional stores to that cache line are being sent by the processor core. Control bits 215 represent an assortment of additional bits that are utilized by STQ controller 205.

Store operations typically originate at the processor core 203 and are temporarily stored in an entry of the store queue 207 until dispatched to the lower level (L2) cache for storage. The store operations target a particular cache line (or portion of the cache line) identified by the address within the store operation, and the operation also provides data to be stored within the addressed portion of that cache line (e.g., byte 12).

The store operations update particular bytes within the cache line entry. Concurrent with these data updates, corresponding bits within byte enable register are set to track which bytes within the cache line entry have been updated by store operations. Typically, a series of store operations writing to a same entry in the store queue are absorbed by the store queue entry before the line is dispatched to the L2 cache. This absorption of multiple store operations into a single entry is referred to as "gathering" stores, since multiple different stores addressing the same cache line are "gathered" into an entry of the store queue buffer before the line is presented to the L2 cache for storage. The gathering of stores allows many different store operations targeting a given cache line to be absorbed by the store queue before the entry is sent to update the L2 cache.

When a cache line entry is removed from the store queue to be sent to the L2 cache, the cache line entry is sent to an RC dispatch and assigned to an RC state machine, which updates the cache line in the L2 cache with the data from within the entry. Thus, for every RC machine assigned to a store operation, the entire cache line must be read and manipulated regardless of how many bytes of the cache line are actually being updated. It is thus more efficient to absorb multiple stores in the store queue entry before passing the line onto the L2 cache. Gathering stores also reduces the number of RC machine tenures required for store operations to a single cache line and also reduces the time required to update a cache line when multiple processor-issued stores update individual portions of the same cache line.

An existing entry is usually available for gathering when the entry holding previously issued store operation(s) for the same cache line address has not yet been selected for dispatch to an RC machine. In conventional implementations, once an entry in the store queue has been assigned to a target cache line, subsequent stores targeting that cache line are gathered within that entry until a condition occurs that prevents further gathering of store operations to that entry. The STQ controller 205 controls when stores to a cache line are allowed to gather. For example, the STQ controller may prevent further gathering of stores to an entry when the entry is selected for dispatch. Also, a gather is typically stopped when a barrier operation is encountered, as is known to those skilled in the art.

Returning now to FIG. 2A, in addition to the above described hardware components, processor chip 201 of FIG. 2A also includes a core interface unit (CIU) 230, which is located between the store queue controller 205 and the core 203. CIU 230 keeps track of the number of entries the store queue is currently using. A "store_gathered" signal 236 is sent to the CIU 230 from the store queue controller 205 when an issued store operation gathers into an existing entry (i.e., did not use up a new entry). Also, a "pop" signal 238 is sent to the CIU 230 from the store queue controller 205 when a store operation is forwarded to the L2 cache, allowing the entry to be re-assigned to a new set of store operations. Store_Req 231 tells the CIU 230 when the store queue 207 may assign an entry to a new store operation. With these signals, the CIU 230 is able to keep track of the number of entries the store queue is currently utilizing. The CIU 230 communicates with the processor core 203 via a "store busy" (or "store full") signal 234 that informs the core's issuing logic 245 when the store queue 207 is full. The store queue full signal is asserted (e.g., a logic high "1") when all the entries are being used and de-asserted (e.g., a logic low "0") when there is an available entry in the store queue.

With this configuration, the store queue 207 sends these handshake signals to the CIU 230, and the CIU 230 sends store busy signals to the core 203. The processor core 203 thus detects a "queue full" condition when the core receives a store full signal 234 from the CIU 230 indicating that all store queue entries are being utilized.

Associated with CIU 230 is a mechanism for counting the number of entries being utilized within the store queue. This mechanism is referred to as the entry tracking logic (ETL). ETL 232 keeps track of how many store queue entries are currently being used, and the ETL 232 also signals the core to stop issuing more store operations to the store queue by informing the core when the store queue is full. In conventional systems, the ETL 232 tracks when there are available entries to assign to store operations being issued by the core. The core is thus able to suspend issuance of store operations when those operations cannot be buffered within the store queue. In the processor design of FIG. 2A, the ETL 232 is located within the CIU 230.

In other processor chip designs, a simple counter is provided to assist in tracking the number of entries being utilized within the store queue. The counter is located in either the processor core itself or in the store queue mechanism. Some comparative logic is provided to compare the count value against the threshold value that indicates the store queue is full. When the counter is within the core, then the cores simply stops issuing new store operations when the counter indicates all the entries are being utilized. When the counter is located within the store queue, the store queue sends a full signal to the core, which causes the core to stop issuing store operations.

These other processor designs are illustrated by FIGS. 2B and 2C, which respectively provide the entry tracking logic 232 as a part of either the core 203 or the store queue mechanism 240. With the processor design of FIG. 2B, where the entry tracking logic 232 is located within (or associated with) the store queue mechanism 240, all tracking occurs at the store queue and a busy signal 234 is sent up to inform the core 203 when to stop/suspend issuing store operations. However, with the processor design of FIG. 2C where the entry tracking logic 232 is located within the core 203, the handshake signals, including pop signal 238 and store_gathered signal 236 are sent on the interface to the core.

Notably, a series of secondary processes are required for determining whether there is an available entry within the store queue. The particular process utilized is dependent on the configuration of the processor chip, with respect to location of the ETL. FIGS. 3A and 3B, described below, both assume a processor chip design similarly to that of FIG. 2A.

FIG. 3A illustrates a general process by which processor core 203 of FIG. 2A determines when to issue store operations to the store queue. The process begins at step 301 and proceeds to step 303 at which a determination is made whether there is a new store operation to be issued. When there is a new store operation to be issued, a next determination is made at step 305 whether the store queue is full. Determining when the store queue is full involves a check of whether the store queue full signal is asserted. In all prior art implementations, the store queue asserts the full signal as soon as a last available entry receives a single store operation. Thus, the "full" store queue may actually include one or more partially full entries that may still be able to gather store operations and for which store operations are still being generated within the execution pipeline.

If the store queue is full (i.e., the store queue full signal is asserted), then the processor withholds (i.e., stalls/suspends) issuance of additional store operations at step 306 until the core is signaled that the store queue has an available entry (i.e., the store queue full signal is de-asserted). If the store queue is not initially full, the processor issues the store operation to the store queue, as shown at step 307.

FIG. 3B illustrates a general process by which a store queue mechanism 240 handles a store operation that is received from the processor core 203 within a processor chip configured similarly to FIG. 2A. The process begins at step 310 and proceeds to step 311 at which a store operation is received at the store queue from the processor core. A determination is made at step 313 whether the store queue is currently holding a gatherable entry for the cache line that is the target of the store operation. The store queue checks the addressing component of the store operation and examines the address associated with each active entry. When an entry assigned to the target cache line is present in the store queue and the entry is allowed to gather, the entry gathers the store operation, as shown at step 315.

Once an entry gathers the store operation, the store queue controller 205 asserts the store_gathered signal, which is transmitted to the CIU, as shown at step 317. If the target cache line is not represented by an entry within the store queue, the store operation is allocated to the unused entry (i.e., an entry that is not currently being utilized for a different target cache line) as shown at step 319. The process then ends at step 321.

Assertion of the store full signal causes the processor core to suspend issuance of store operations to the store queue until an entry becomes available and the store full signal is de-asserted (steps 305-306 of FIG. 3A). All subsequent store operations are held at the processor core (i.e., prevented from being issued to the store queue) until an entry becomes available in the store queue. An entry becomes available when the contents of that entry are dispatched to an RC machine and sent to the L2 cache for storage therein. A variety of different policies may be utilized to determine when cache lines are moved from the store queue to be stored in the L2 cache.

Current design of store queues provided only a very limited capacity (e.g., a maximum of 6-8 entries). With this limited capacity, current methods of suspending processor issuance of store operations to store queues when the full signal is asserted has several obvious limitations that lead to processor bottlenecks during store operations. For example, in conventional systems, the full signal is asserted as soon as the last available entry is assigned to an issued store operation. Thus, a single byte store assigned to last entry prevents the core from issuing additional store operations to the store queue.

There is no accounting in conventional systems for execution of code that provides multiple stores that may be gathered into that last entry or into a previously assigned entry. For example, with certain types of code, such as scientific codes, it is quite common for a stream of store operations to target (and be gathered into) a single entry. With conventional systems, however, the store queue immediately asserts the "full" signal when the first of a stream of store operations addressing the same cache line hits the store queue and is assigned to the last available entry of the store queue.

Since the store operations are generated and issued faster than the store queue can request to the RC machine, a bottleneck of sorts occurs and the processor has to suspend issuance of other store operations even when those operations could possibly gather into an existing entry of the store queue. The core is made to wait until the store queue pops one or more of the entries before the core can resume issuing store operations.

Because a regular store operation does not update an entire cache line, but only a fractional portion thereof, at least the last entry to be used in the store queue will only have a fraction of the cache line that could possibly gather into the queue entry although the counter or ETL indicates the store queue to be full. The next store operation is not issued and may not gather into one of the currently used entries until one of the entries is popped from the store queue. In conventional systems, the core will simply stall and wait for the busy signal to be de-asserted or some kind of handshake signal that tells the core the store queue is no longer full (e.g., when the store queue pops an entry to the L2 cache).

The present invention recognizes that it would be desirable to provide a method and system that would enable a processor to continue issuing store operations that may be gatherable into one of the entries of a full store queue. The invention further recognizes that it would be desirable to provide a method and system for speculatively issuing store operations to the store queue to remove the bottlenecks inherent with conventional systems which suspend issuance of store operations whenever the store queue is full. These and other benefits are provided by the invention described herein.

SUMMARY OF THE INVENTION

Disclosed is a method, system, and processor chip design for enabling a processor core to speculatively issue store operations to the store queue after the core receives indication that the store queue is full. The processor core is configured with two additional components, speculative store logic and speculative store buffer. Regular stores are issued until the store queue is full. The speculative store logic enables the processor core to continue issuing store operations while the store full signal is asserted. The store operation is issued speculatively, and a copy of the speculatively issued store operation is placed within the speculative store buffer. The core then waits for a signal from the store queue indicating whether the store operation was accepted into the store queue or rejected. When the speculatively-issued store operation is accepted within the store queue, the copy is discarded from the buffer, and the core sends out another store operation, which may also be speculatively issued if the store full signal is still asserted.

When the speculatively issued store operation is rejected, the speculative store logic re-issues the store operation at some later time. The logic also prevents speculative issuance of a subsequent store operation that addresses the same cache line as the rejected store operation. If the next store operation does not address the same cache line, then the next store operation may be speculatively issued to the store queue and copied to a speculative store buffer. The processor core is thus able to continue issuing store operations speculatively as long as no architectural rules are violated.

The rejected speculative store operations are resent to the store queue when the store queue full signal is no longer asserted. In one embodiment, priority is given to those rejected store operations in the speculative store buffer over more recent stores coming down the processor pipeline. This enables earlier-issued speculative stores to proceed ahead of current stores.

Entry tracking logic (ETL) is provided in addition to the speculative store logic to track the "full" status of the store queue and inform the core when the store operation is being speculatively issued. Depending on the processor chip design, the ETL may be located within the core, the store queue mechanism, or within a core interface unit (CIU). When the ETL is located within the core or the CIU, a set of handshake signals are provided to update the value within the ETL. These signals include a "spec_gathered" signal that informs the speculative store logic of the processor core when the speculatively issued store operation has gathered into an existing entry of the store queue.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE
EMBODIMENT(S)

The present invention provides a method and processor-chip design/configuration by which a processor core speculatively issues store operations to a store queue when the entry tracking mechanism indicates that all the store queue entries have been assigned (i.e., the store queue is full/busy). As utilized within the invention, the term "speculative" and derivatives thereof refers to the fact that the store operation is issued while the core is aware that the store queue is full. The core speculates that the store operation may still be gathered into or allocated to an entry of the store queue despite the current indication that the queue is full. Also, when there is no gatherable entry, the store operation may still be speculatively issued on the chance that an entry is popped from the store queue (i.e., the data is sent to the RC mechanism and the entry becomes available) proximate to the time the store operation reaches the store queue. The invention minimizes processor stalls (with respect to issuing store operations) seen with conventional systems whenever a store "queue full" condition is signaled to or determined by the core's logic.

Three different embodiments are provided, each based on the particular processor chip configuration. In a first embodiment, a core interface unit (CIU) is provided with entry tracking logic (ETL). The second and third embodiments provide ETL within the core and the STQ mechanism, respectively. Generally, the invention provides enhancements and/or additions to the entry tracking logic as well as additional logic within the store queue mechanism and processor core. These enhancements collectively enable the speculative issuance of store operations, as described below.

Figure 1:
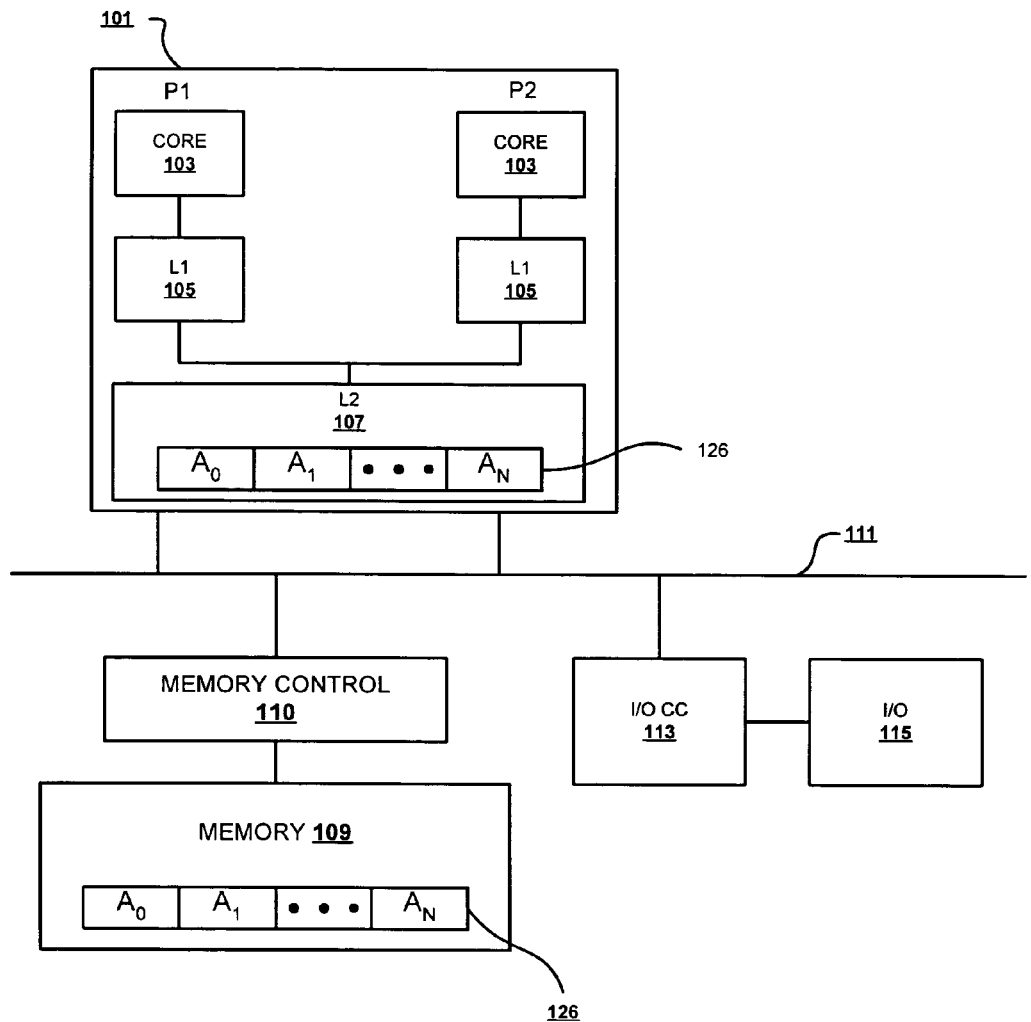
FIG. 1 is a block diagram illustrating a multiprocessor data processing system within which the various features of the invention may advantageously be implemented.
Figure 2A:
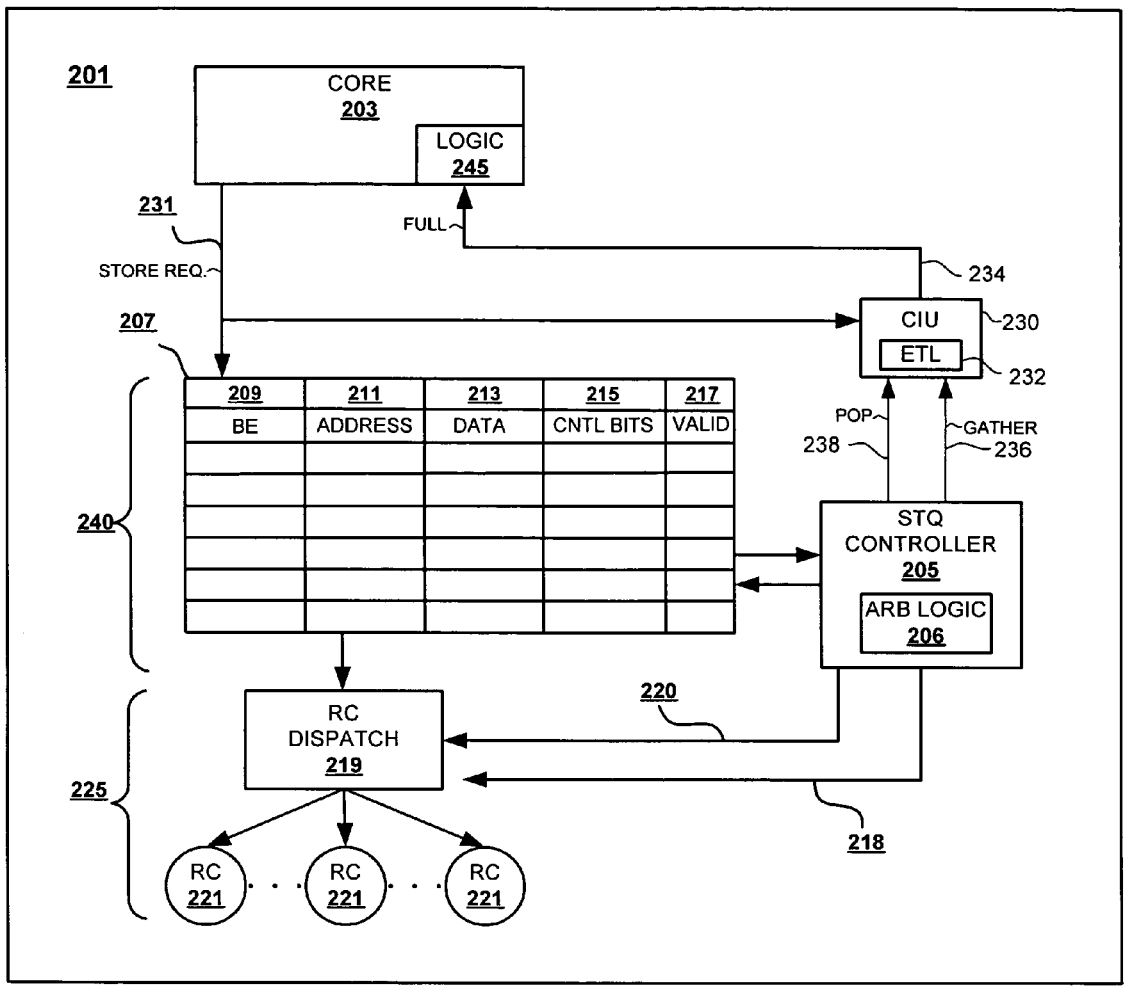
FIGS. 2A, 2B, and 2C are prior art representations of processor chip components utilized to provide and process store operations prior to forwarding the store operations to a lower level cache.
Figure 2B:
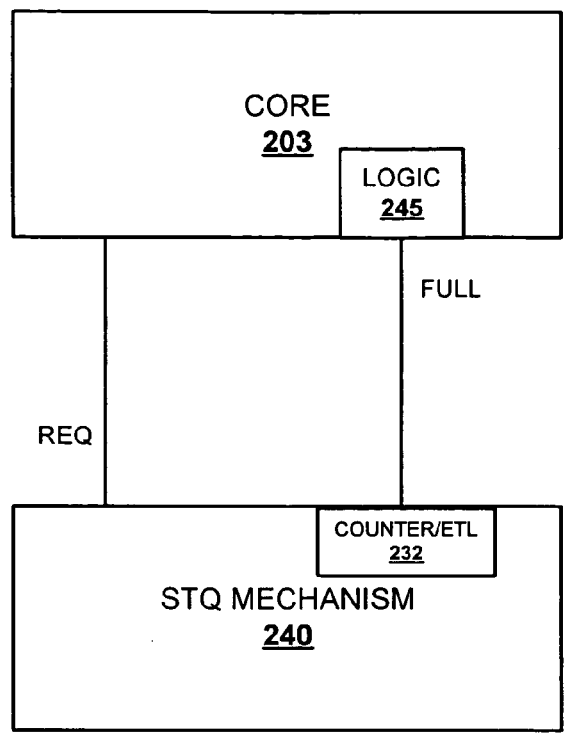
Figure 2C:
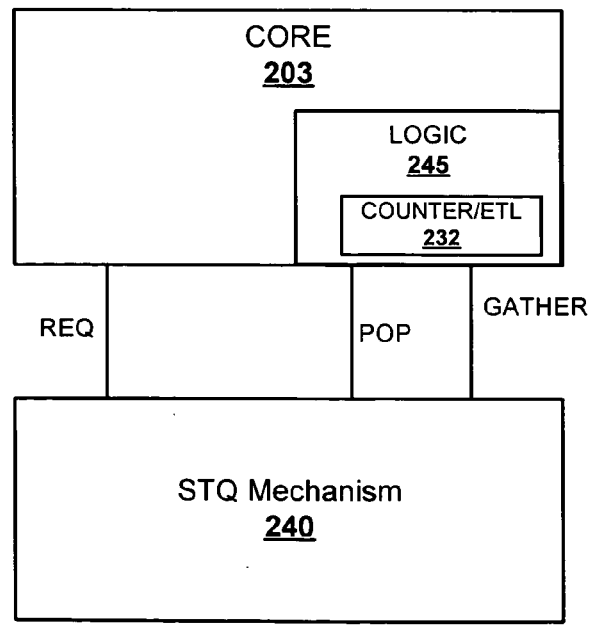
Figure 3A:
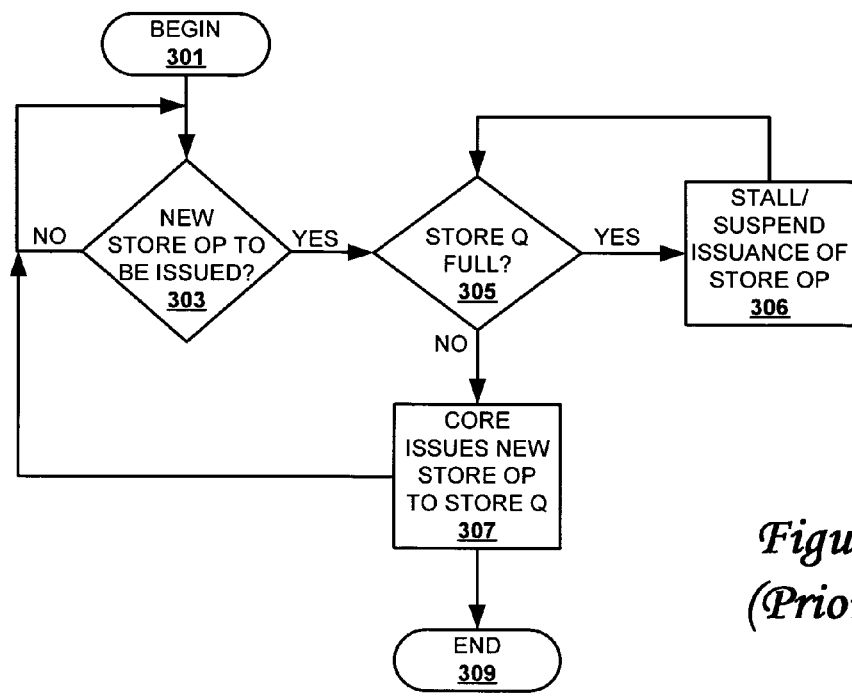
FIG. 3A is a flow diagram illustrating the process of issuing store operations to a store queue according to prior art.
Figure 3B:
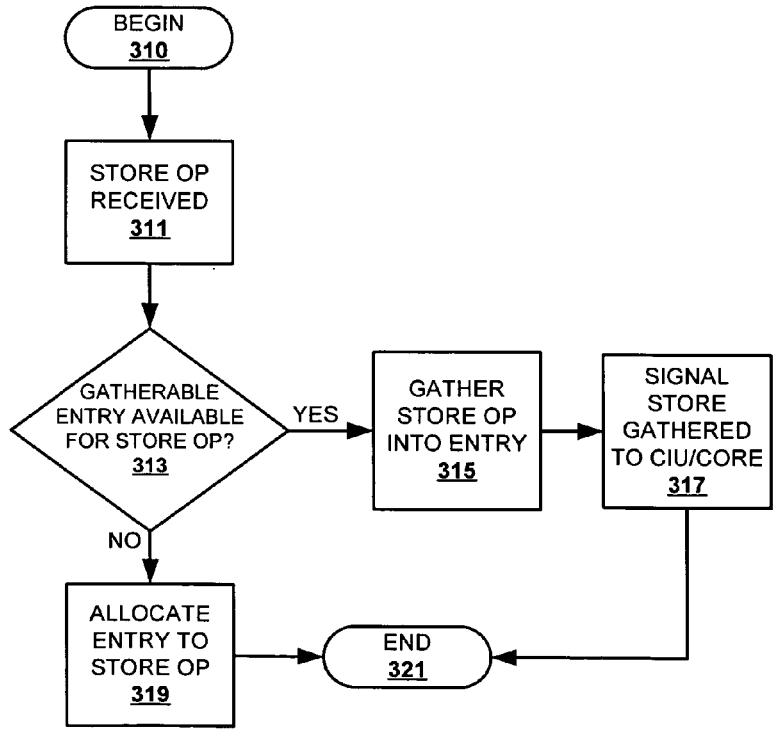
FIG. 3B is a flow diagram illustrating the process of storing data to an entry of a store queue according to prior art.

With reference now the figures and in particular to FIG. 1, there is illustrated a multi-processor data processing system (MP) 100. MP 100 comprises several major components including processor chips 101, memory 109, and I/O device(s) 115. I/O device(s) have an associated I/O controller 113, while memory 109 has an associated memory controller 110 that controls access to and from memory 109.

Processor chips 101 are connected to memory 109 and I/O devices 115 via interconnect (system bus) 111 by which processor chips 101 communicate with each other and with memory 109, I/O devices 115, and other peripheral devices. Interconnect 111 is a bifurcated bus with a data bus for routing data and a separate address bus for routing address transactions and other operations.

Processor chips 101 each contain two processor cores 103, and onboard L1 cache 105 and shared L2 cache 107. According to the present invention, L2 caches 107 support intervention. Further, each cache is designed with a cache directory, an array of cache lines, and all data operations at each cache are completed according to a coherency protocol, such as a MESI coherency protocol. For illustrative purposes, a sample cache line is provided within L2 cache, and the invention is described from the perspective of updating a cache line (A) in the L2 cache with store operations issued by a processor core and temporarily buffered in a store queue entry. As illustrated within L2 cache 107 of FIG. 1, exemplary cache line A 126 may contain multiple blocks/granules of data, corresponding to individual bytes, words, double words, etc., each of which may be the target of an update by a processor-issued store operation. The specific size of each cache line 126 and number of updatable data blocks/granules may differ from system to system, and the exact parameters utilized within the invention are adjusted accordingly to provide the general functionality described herein.

The present invention is described with reference to MP 100 and component parts of processor chips 101 illustrated by FIG. 4A (described below), but the present invention may be applied to different configurations of data processing systems that are not necessarily conventional. As an example, the invention may be implemented within a non-uniform memory access (NUMA) system, wherein the system memory (RAM) is divided among two or more memory arrays (having separate memory controllers connected to the system bus) and allocated among the processing units. Also, MP 100 could include new hardware components not shown in FIG. 1, or have a novel interconnect architecture for existing components. MP 100 may also have a different number of processing units. Those skilled in the art will therefore appreciate that the present invention is not limited to the generalized system shown in FIG. 1.

Several of the features of the invention are carried out by logic components on processor chips 101. Specifically, the addition of components enhances tracking of and processing beyond store full conditions. The invention particularly involves speculative issuance of store operations from the core to the store queue when there is a chance the store operation may gather to an existing entry of the store queue. However, while the invention is practiced within the general data processing system 100 of FIG. 1, the particular implementation features of the invention are provided within the processor core, store queue mechanism, and other logic components of the processor chip, as exemplified by FIGS. 4A-4C.

Figure 4A:
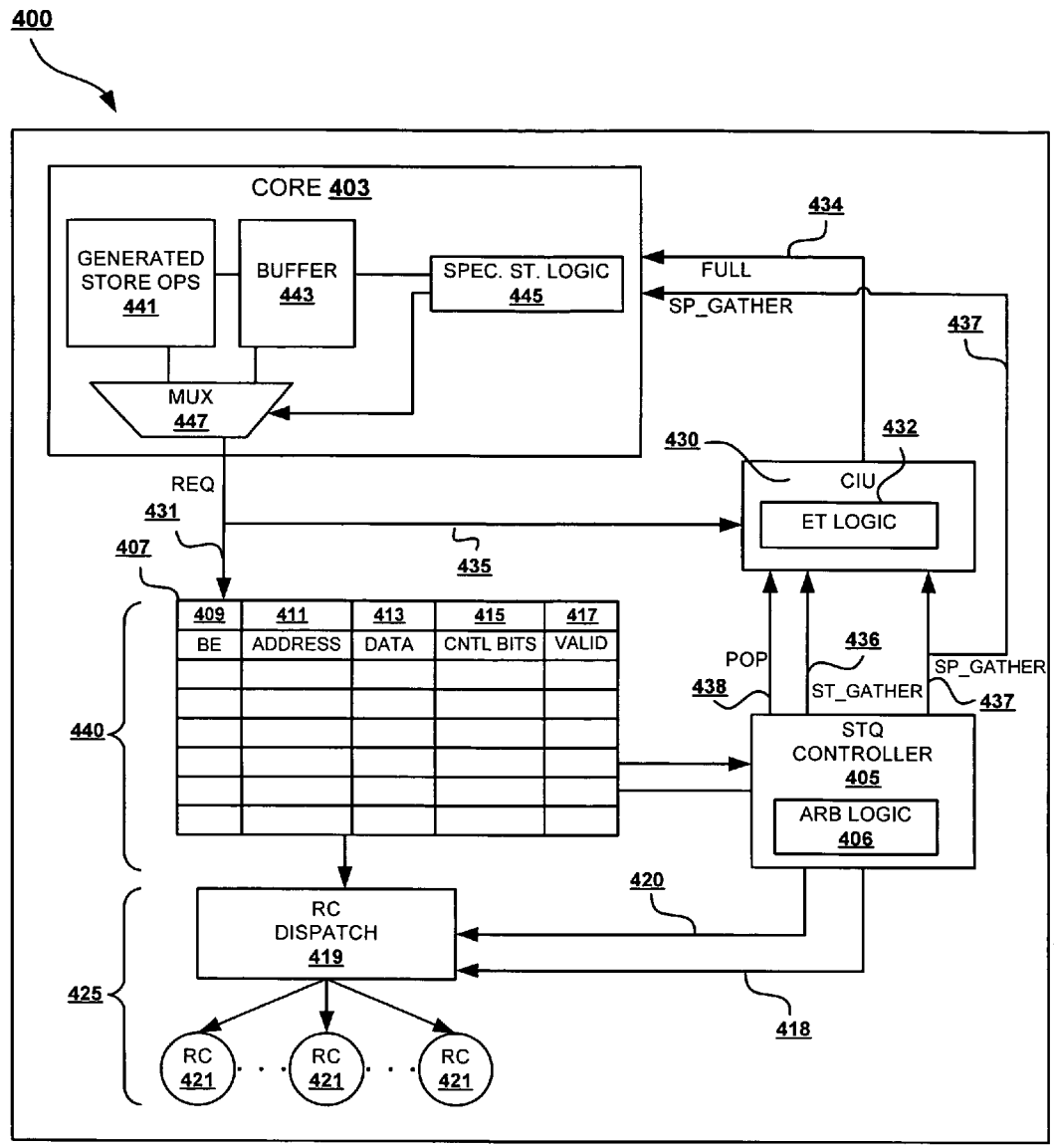
FIG. 4A is a block diagram illustrating main components of a processor chip that is configured to enable speculative issuance of store operations from the processor core to the store queue while the store queue's full signal is asserted according to one embodiment of the invention.

With specific reference to FIG. 4A, there is illustrated a processor chip 400 that generally includes a processor core 403, store queue mechanism 440 and read claim (RC) mechanism 425. Processor core 403 includes a plurality of logic components and registers (not shown) for completing standard processing of program instructions. Among these logic components and registers is a mechanism for generating store operations within the execution pipeline. For illustrative purposes, the mechanism that generates these store operations as well as the set of generated store operations are collectively represented within FIG. 4A as a "generated store operation" pipeline 441.

To implement the invention, several enhancements are provided within the design of the processor chip 400, particularly the processor core 403, store queue controller 407, and, in one embodiment, the CIU 430. A summary of these enhancements include: (1) addition of speculative store logic 445 and a speculative store buffer 443 within the processor core to enable speculative issuing of store operations; and (2) addition of handshake signals to and from the processor core to signal when a speculatively issued store operation gathers to an entry of the store queue.

Processor core 403 thus includes a store buffer 443, utilized within the invention to temporarily store a copy of each store operation that is speculatively issued to the store queue 407. The size of the store buffers is a design parameter and is preset to enable each buffer to hold the maximum sized store operation the processor core 403 may issue. That design parameter takes into account both the size of the data and the size of the addressing information, and any other information that is associated with the store operation.

A copy of the speculatively-issued store operation is placed within one of the store buffer 443 when the store operation is first issued speculatively. One of two occurrences determines when the copy is deleted from the store buffer 443: (1) the speculatively-issued store operation is gathered into (or allocated) an entry in the store queue; or (2) the store operation is reissued to the store operation as a normal store operation (i.e., without speculation). Both of these occurrences are described in greater details below.

In addition to store buffer 443, processor core includes "speculative" store logic 445. The speculative store logic 445 performs several functions, among which are: (1) tracking when a store operation is issued speculatively. This may involve tracking a full status of the store queue; (2) temporarily storing a copy of speculatively issued store operations in the speculative store buffer 443; and (3) signaling the store operation generation pipeline when to continue speculatively issuing store operations. This signaling when the previous speculatively issued store operation is gathered to an existing entry or allocated a new (recently popped) entry.

In one embodiment, speculative store logic 445 also controls the re-issuing from the store buffer 443 the copy of the store operation that was speculatively issued. Determining when to re-issue the buffered store operations is controlled by pre-established criteria, including the current status of the store queue. In the illustrated implementation, later selection and re-issuing of a buffered store operation from the store buffer 443 is handled by speculative store logic along with selection logic, such as multiplexer (MUX) 447, which enables buffered store operations to be re-issued ahead of the store operations provided by the generated store operation pipeline 441. As explained in greater details below, priority is given to the store operation within the speculative store buffer 443 over newly generated store operations coming down the pipeline. Also, in one embodiment, the buffered store operation may be re-issued as a regular store operation as soon as the store queue 407 is no longer full or may be re-issued again as a speculative store operation if there is a lapse in the generation of new store operations.

Store queue mechanism 440 includes store queue controller 405 and store queue 407, and RC mechanism 425 includes RC dispatch 419 and RC machines 421. Store queue 407 includes the standard registers for storing information, namely address register 411, data register 413, control bits 415, valid bit 417, and byte enable register 409. As shown, byte enable register 409 contains a number of bits, each corresponding to a smallest size of store granule within the data register 413. For simplicity, the invention will be described with cache lines having a length/capacity of 128-bytes that are updated via a plurality of processor-issued store operations.

Determining when the store queue 407 is full is completed via entry tracking logic 432, which, depending on the processor chip configuration may be located either in the store queue mechanism, the processor core, or CIU. Each of the three possible locations of the entry tracking logic 432 provides a somewhat different process for completing the store queue tracking functionality of the invention and requires a different set of handshake signals. However, for simplicity, the invention is primarily described utilizing processor chip configuration of FIG. 4A in which the entry tracking logic 432 is located within CIU 430. The other two embodiments are described below as alternate embodiments.

CIU 430 includes entry tracking logic 432. CIU 430 is located between processor core 403 and store queue controller 405 and is coupled to processor core 403 and store queue controller 405 via a set of signal wires. These signal wires include a request signal 435 from the core dispatch mechanism (not shown) to the CIU 430, a queue full signal 434 sent to speculative store logic 445 of processor core 403, and pop signal 438 and store_gathered signal 436 sent from store queue controller 405. Request signal 435 alerts the ETL 432 that another store operation has been issued from the core. Queue full signal 434 is asserted when all the entries of the store queue have been assigned to at least one store operation and are waiting to be dispatched. This signal informs the speculative store logic 445 that the next store operation issued to the store queue 407 will be speculative. Pop signal 438 is asserted to whenever a store queue entry is dispatched (i.e., the contents given to an RC machine for storage within a lower level cache). This leaves the entry available for re-allocation to new store operations. Store_gathered signal 436 indicates when a normal store operation has gathered to an existing entry.

In addition to the full signal 434 received by the speculative store logic 445 from the CIU 430, an additional signal is provided in the illustrated embodiment, which is referred to herein as "spec_gathered" signal 437. Spec_gathered signal 437 informs the speculative store logic 445 that the speculatively issued store operation has been gathered to an entry in the store queue 407. This signal is utilized by the speculative store logic 445 to determine whether to continue issuing store operations speculatively.

The speculative store logic 445 also tracks when the spec_gathered signal indicates a gather of a store operation that was speculatively issued, and responds accordingly. Alerting the speculative store logic 445 when a speculative store is accepted enables the speculative store logic 445 to remove the copy of the store operation from the store buffer 443.

Figure 4B:
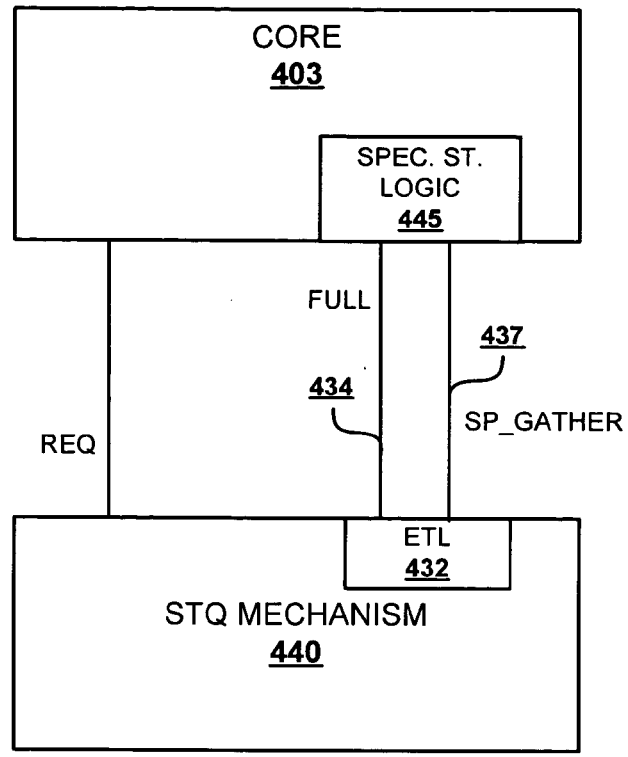
FIGS. 4B and 4C are block diagrams illustrating alternate configurations of the main components of a processor chip that supports speculative issuance of store operations in accordance with two embodiments of the invention.

FIG. 4B illustrates a second embodiment where the processor chip is designed with the ETL 432 integrated into or associated with the store queue mechanism 440 (specifically the STQ controller 405). With this implementation, no intermediary signals are required and the ETL is connected directly to the speculative store logic 445 via full signal 434 and spec_gathered signal 437.

Figure 4C:
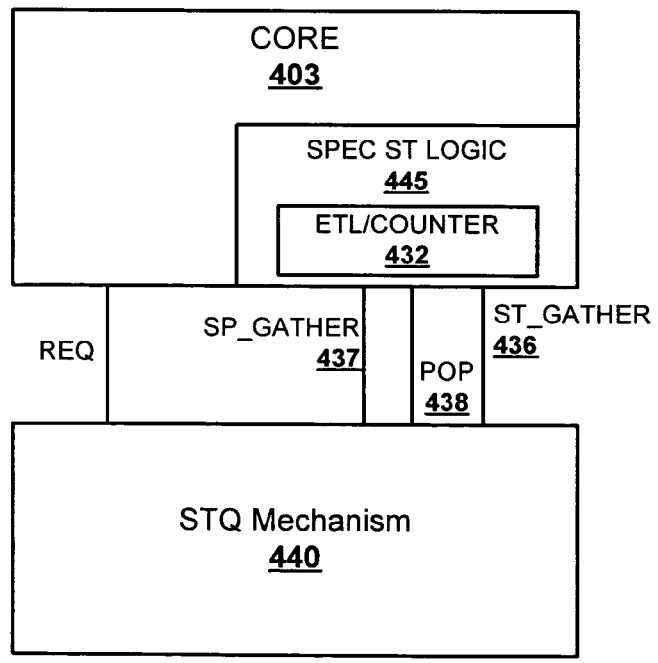

Finally, FIG. 4C illustrates the third embodiment where the processor chip is designed with the ETL 432 located within the processor core 403 and integrated into or associated with the speculative store logic 445. Unlike the previous two embodiments, no full signal is required from the store queue since the tracking of the entries is completed within the core itself. All other status or response signals, i.e. store_gathered signal 436, spec_gathered signal 437, and pop signal 438 are provided directly to the ETL 432 (and/or speculative store logic 445) within the processor core 403.

The speculative store logic 445 responds to the assertion or de-assertion of the full signal by buffering issued stores when the signal is asserted. The buffered stores may then be re-issued when the full signal is no longer asserted or removed/deleted when the spec_gathered signal is asserted.

Figure 5A:
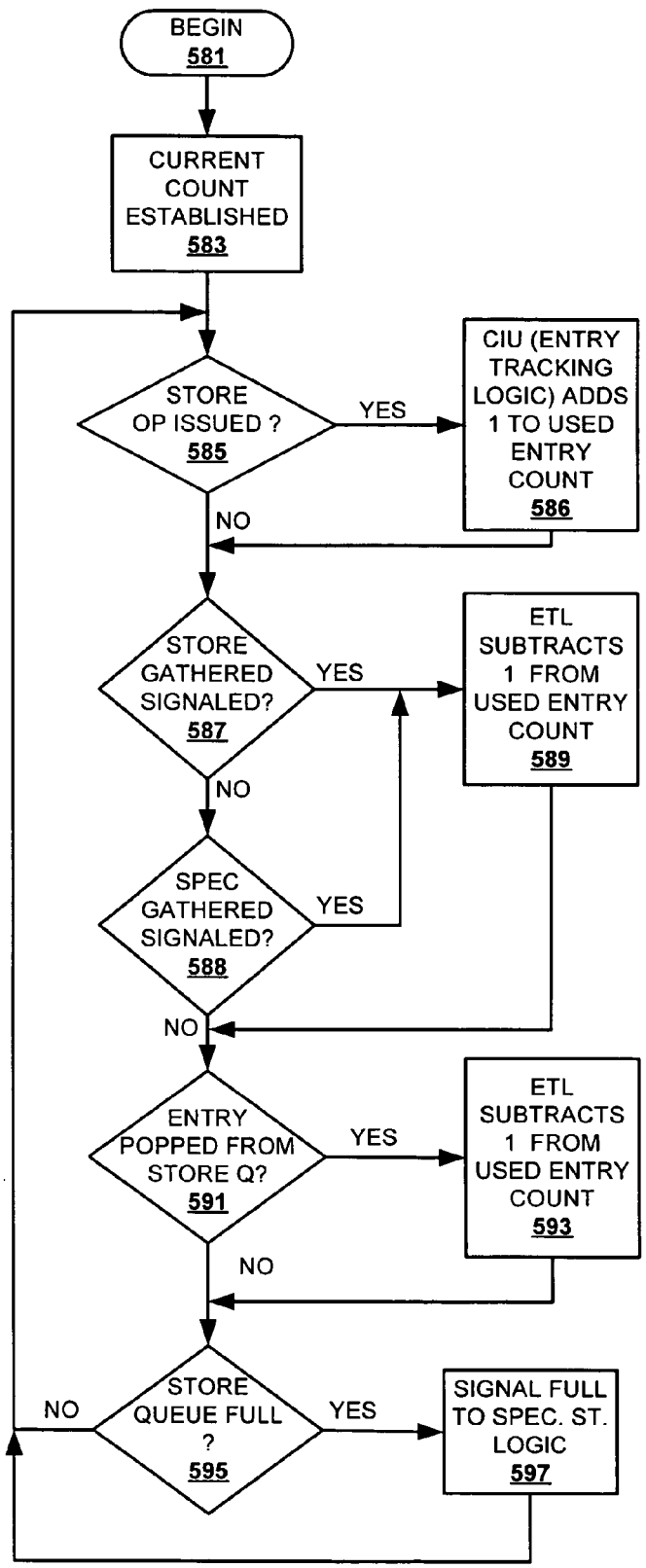
FIG. 5A is a flow chart of the process of tracking and updating the number of store queue entries currently assigned/allocated in accordance with one implementation of the invention.

The process by which the entry tracking logic 432 completes the tracking function of the store queue entries is illustrated and described by FIG. 5A. Notably, although the steps of FIG. 5A are sequentially illustrated, the actual processing at each decision step occurs in parallel. ETL 432 maintains a counter that tracks the number of entries within the store queue that are currently being utilized. The entry tracking process begins at step 581 and proceeds to step 583 at which a current count of the store queue is established. During initial boot up of the processor, for example, the current count is zero. The entry tracking logic monitors the issuance of store operations at step 585. When a store operation is issued, the ETL adds 1 to the counter at step 586. The entry tracking logic monitors at step 587 for receipt of a store_gathered signal. The entry tracking logic also monitors at step 588 for receipt of a spec_gathered signal. If either a store_gathered signal or a spec_gathered signal is received, the entry tracking logic subtracts 1 from the counter at step 589.

An alternate embodiment is contemplated in which the store_gathered signal is utilized to also indicate when a speculative store operation gathers to an entry of the store queue. This embodiment assumes that the store queue processes only a single store operation at a time. Thus, the ETL is incremented to account for an issued store whether issued normally or speculatively and the ETL is decremented when the store_gathered signal is pulsed. Notably, however, the ETL continues to signal full status until the counter decrements to a number that is less than the number of entries in the store queue. Since the illustrative embodiment is described with a single buffer, the counter of ETL only has to accommodate one additional count above the maximum number of entries in the store queue.

Returning to step 591 of FIG. 5A, the entry tracking logic also monitors for a signal that an entry has been popped from the queue. When an entry is popped from the queue, the entry tracking logic subtracts one from the count, as shown at step 593. Lastly, the entry tracking logic determines at step 595 whether the store queue is full. When the store queue is full, the entry tracking logic signals the speculative store logic of the full status of the store queue, as shown at step 597. Thus, the counter counts up to the maximum number of store queue entries and then remains in the "full status" until an entry is popped from the store queue. Processing of speculatively issued store operations occurs while this full status is maintained.

Figure 5B:
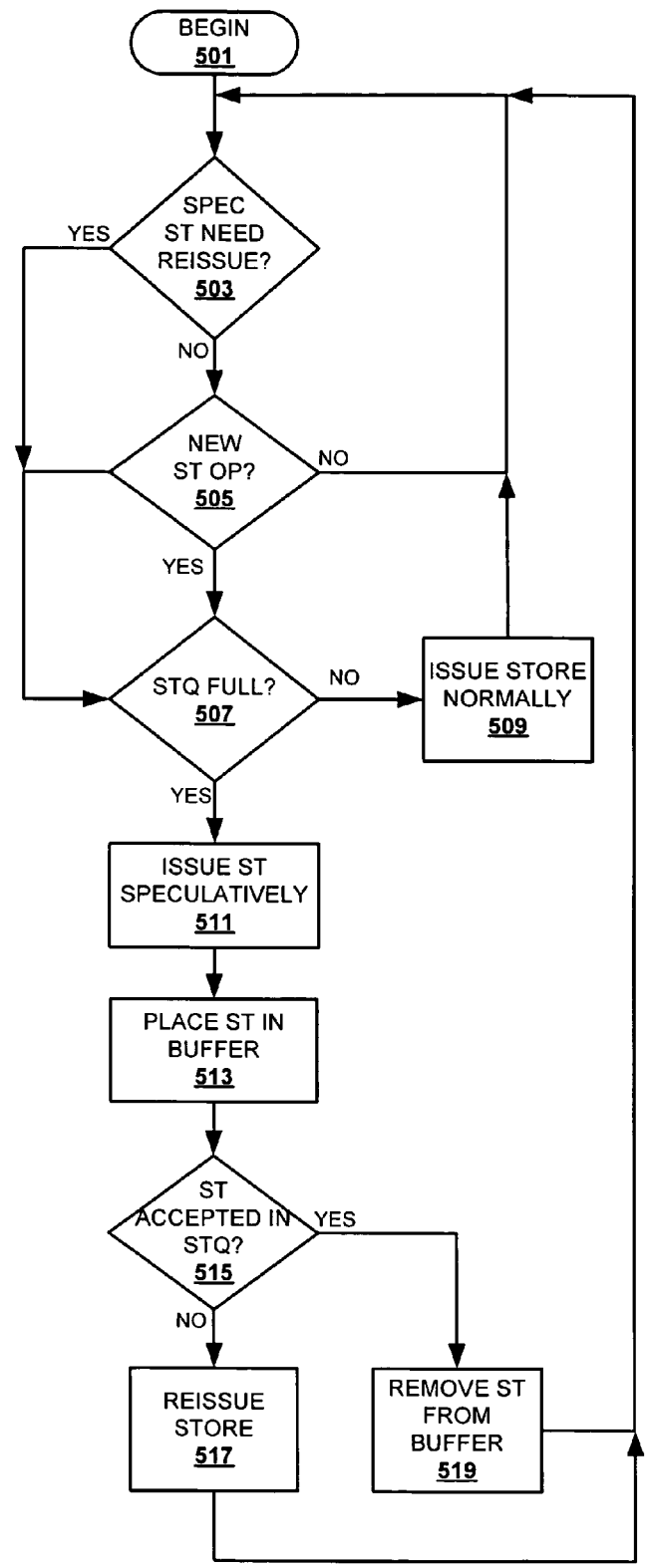
FIG. 5B is a flow chart of the process of speculatively issuing store operations within a processor chip configured similarly to FIG. 4A in accordance with one implementation of the invention.

FIG. 5B illustrates the process of issuing store operations speculatively to the store queue from the processor core. The process begins at step 501 and proceeds to step 503, at which a determination is made whether a speculatively issued store needs to be re-issued. When there is no speculative store to be re-issued, a next determination is made at step 505 whether there is a new store operation to be issued. When there is a speculative store to be reissued (or a new store op to be issued) a check is made at step 507 whether the store queue is full. That is, the processor core checks the status of the store full signal 434. When the store queue is not full, the store operation (whether the re-issued speculative store or the new store operation) is issued as a normal store operation (i.e., not a speculative issue), as indicated at step 509. When the store full signal indicates the store queue is full, speculative store logic is activated, and the store operation is speculatively issued to the store queue, as shown at step 511. Contemporaneously, a copy of the speculative store operation is placed within the store buffer at step 513.

Following the speculative issuance of the store operation, the speculative store logic checks whether the speculatively issued store operation was accepted into the store queue, as shown at step 515. This check entails monitoring for receipt of a spec_gathered signal. Receipt of the spec_gathered signal confirms to the speculative store logic that the speculatively-issued store operation was gathered to an existing entry of the store queue or allocated to a recently popped entry. When a spec_gathered signal is pulsed to the core, the speculative store logic removes the copy of the store operation from the store buffer, as indicated at block 519. However, if the "spec_gathered" signal is not pulsed, then at step 517, the speculative store logic of the core re-issues the buffered store operation at some later time.

Figure 5C:
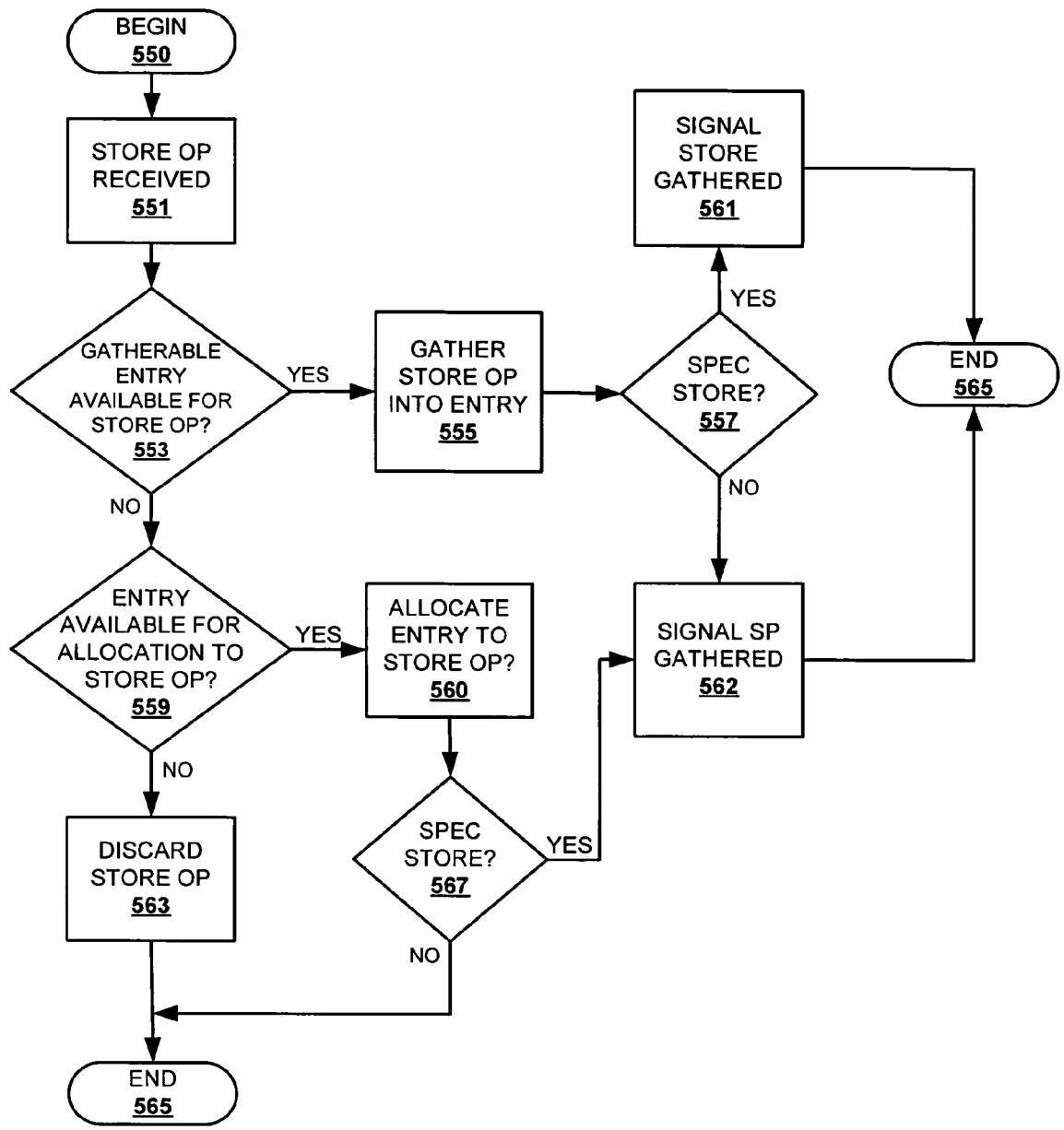
FIG. 5C is a flow chart of the process of a store queue response to a speculatively issued store operation when the store queue is full, according to one implementation of the invention.

FIG. 5C is a flow chart depicting the processing that occurs at the store queue mechanism when speculatively-issued store operations are received at the store queue. The process begins at step 550 and proceeds to step 551 at which the store queue receives a store operation (i.e., while the store full signal is asserted). A check is made at step 553 whether a store queue entry for the same target cache line exists in the queue and is still gathering store operations. If there is no entry to gather the store operation to, a next check is made at step 559 whether there is now an available entry within the store queue. An available entry may exist if one (or more) of the entries was popped proximate to the time the store operation was issued or during the clock cycles required to scan the entire store queue for an available entry within the store queue.

If there is an available entry, the store operation is allocated to the entry at step 560. However, if there is still no available entry, the store queue discards the speculative store, as shown at step 565. Normal store operations are always gathered or allocated to an entry because they are only issued when the store queue is not full. However, according to the described implementation, a speculatively issued store operation that is not gathered into or allocated to an entry is discarded. The processing for that store operation at the store queue then ends, as indicated at step 565.

Returning to step 553, if there is a gatherable entry, the store operation is gathered into the entry at step 555. Once the store operation is gathered into (step 555) an entry in the store queue, a determination is made at step 557 whether the store operation was a speculative store operation. When the store operation was not a speculative store, the store_gathered signal is pulsed, as shown at step 561. However, when the store operation was speculatively issued, the spec_gathered signal is pulsed to the processor core at step 562. This signal is also pulsed (step 562) following a determination at step 567 that an entry was allocated to a speculative store operation.

Several alternate embodiments of the invention are contemplated that provide some performance enhancements to the above described speculative store logic. These embodiments entail additional enhancements within the core logic and the logic of the store queue mechanism. For example, in one embodiment, the store queue also provides a "no_spec" signal to the core (or CIU). When asserted, the no_spec signal informs the core that none of the store queue entries are gatherable, and the core's logic knows that sending a speculative store is futile. Thus, no speculative store operations are issued if the no-spec signal is asserted.

In a next embodiment, after a speculative store is rejected by the store queue (i.e., not gathered into or allocated to an entry) the core waits for the "queue-full" condition to go away before reissuing the speculative store as a regular store. Also, if the next operation in the store pipeline is a non-gatherable type (e.g., a sync operation), that operation is not issued speculatively. The above enhancements prevent the core having to wait for a spec_gathered signal that is not forthcoming.

In one implementation, multiple speculative stores may be launched between the core and store_queue in order to hide the latency between the speculative issuance of the store operation and spec_gathered signal. Each speculative store that gathers into or is allocated to an entry is still associated with a spec_gathered signal that is pulsed a determinable time after the speculative issuance of the store operation. The core maintains a first-in first-out (FIFO) queue (i.e., a multiple-entry speculative store buffer) of the copy of speculatively-issued stores in the order the stores were issued. The speculative store logic is then able to re-issue the store operations in the order they were originally issued. Priority is given to the rejected, speculatively-issued store operations in the speculative store buffer over the more recent stores generated by the processor pipeline. The queued/buffered copies of the store operations are selected at the MUX and issued down to the store-queue ahead of the newer store operations.

The store queue accepts, in order, as many of the speculative stores as the store queue is able to accept. When one of the multiple speculative stores issued from the core is not accepted, both the core's speculative store logic and the store-queue logic assume that all speculative stores after the first one rejected may also be rejected. The core is made to resend all rejected speculatively-issued stores. The first rejected store is resent non-speculatively after which the store-queue is then able to begin to accept the speculative stores again and process them normally.

The invention prevents immediate halting of issuance of store operations since the operation may be gathered to an existing entry or an entry may be popped proximate-in-time to the store operation reaching the store queue. The implementation of the invention thus enables the processor to make forward progress with issuing generated store operations even when the store queue appears to be full. The processor core is thus able to continue issuing store operations speculatively as long as no architectural rules are violated (e.g., no sync can be sent after a rejected store operation).

An entry within a full store queue may still gather a speculatively issued store or be popped at any time from the store queue. Thus, speculatively sending these store operations to the queue enables the processor to continue issuing store operations that may be gathered or allocated within the queue, rather than suspending operation until the store queue is no longer full.

The invention provides several benefits over conventional systems, including: (1) reducing the processor stalls built into conventional methods when the core is forced to wait until a store full signal is de-asserted before the core can issue a next store operation; (2) providing a more efficient implementation of processor-issuance of store operations beyond a store full condition; (3) enabling speculative issuance of store operations to a store queue that is full; and (4) providing an opportunity for the store_gathering logic and entry allocation logic of the store queue to accept or reject some or all of the speculatively issued store operations on-the-fly.

While the invention has been particularly shown and described with reference to a preferred embodiment, it will be understood by those skilled in the art that various changes in form and detail may be made therein without departing from the spirit and scope of the invention. For example, although the invention is described with buffers within the processor core, other implementations may provide buffering for speculative store operation in some other location of the processor chip. This and other alternate implementations all fall within the scope of the invention.

What is claimed is:

1. In a data processing system with a processor chip that includes a processor core and a store queue with multiple entries, a method for speculatively issuing a store operation from the processor core to the store queue, said method comprising:
   determining when the store queue is full, wherein said store queue has multiple entries with at least one entry capable of concurrently holding multiple store operations, and the store queue is "full" when all entries of the store queue currently holds at least one store operation issued from the processor core; and
   while said store queue is full, speculatively issuing a next store operation to the store queue as a first speculative store operation, wherein the next store operation is issued as a normal, non-speculative store operation when said store queue is not full;
   wherein the at least one entry of the store queue is designed to gather multiple store operations when the store operations target portions of the same cache line; and
   wherein said first speculative store operation is scheduled for re-issue to the store queue if (a) the first speculative store operation is not gathered by one of the entries within the store queue, and (b) no entry within the store queue becomes empty before the first speculative store operations arrives at the store queue.

2. The method of claim 1, further comprising:
   creating and holding a copy of said first speculative store operation in a buffer;
   when said first speculative store operation is gathered into or allocated an entry of said store queue, deleting said copy of said speculative store operation from said buffer; and
   when said first speculative store operation is not gathered into or allocated an entry of said store queue, scheduling said copy of said first speculative store operation to be reissued to said store queue, wherein the copy is removed from the buffer and re-sent by the processor core to the store queue when the store queue is no longer full.

3. The method of claim 2, wherein said scheduling includes, when the store queue is no longer full, scheduling said copy of said first speculative store operation to be issued to the store queue ahead of other later store operations being subsequently scheduled by a store operation generation pipeline of said processor core.

4. The method of claim 1, further comprising:
   speculatively issuing a second speculative store operation to said store queue if said store queue is still full and said first speculative store operation is gathered into or allocated an entry of said store queue.

5. The method of claim 4 further comprising:
   determining when a newly generated store operation targets the same cache line address as the first speculative store operation;
   when said first speculative store operation is gathered into or allocated an entry of said store queue, issuing said newly generated store operation to said store queue, wherein said newly generated store operation is speculatively issued as a second speculative store operation if the store queue is still full and issued as a normal store operation if the store queue is no longer full; and
   when said first speculative store operation is not gathered into or allocated an entry of said store queue, withholding the issuance of said newly generated store operation until after the copy of said first speculative store operation within said buffer is reissued to said store queue.

6. The method of claim 5, wherein said withholding step further withholds the issuance of said newly generated store operation until after the store queue is no longer full and the first speculative store operation has been reissued and gathered into or allocated an entry of the store queue.

7. The method of claim 4, wherein when said buffer is a multiple entry buffer capable of holding copies of more than one speculatively issued store operation, said method further comprises:
   holding the copy of the first speculative store operation in a register of the buffer;
   when the first speculative store operation is not accepted by the store queue, determining when the newly generated store operation targets a different cache line from said first speculatively store operation;
   issuing said newly generated store operation as a normal store operation to said store queue when said store queue is no longer full; and
   when said store queue is still full and the newly generated store operation targets a different cache line from said first speculatively store operation:
      speculatively issuing said newly generated store operation as a second speculative store operation independent of said first speculative store operation; and
      creating and storing a copy of said second speculative store operation in a second register of the speculative store buffer.

8. The method of claim 7, wherein said buffer is a first in first out buffer and said copy of said first speculative store is reissued by the processor core to the store queue prior to a reissuing of said second speculative store operation.

9. A processor chip for utilization within a data processing system, said processor chip comprising:
a store queue having multiple entries, each entry capable of gathering multiple processor issued store operations targeting the same address, and the store queue is "full" when all entries of the store queue currently holds at least one store operation issued from the processor core;
tracking logic for determining when all the entries within the store queue have been allocated to at least one processor-issued store operation, indicating that the store queue is full; and
a processor core having normal logic for issuing store operations as a normal store when the store queue is not full and speculative store logic for speculatively issuing store operations when the store queue is full;
wherein a speculatively issued store operation is scheduled for re-issue to the store queue if the speculatively issued store operation is not gathered by one of the entries within the store queue, and if no entry within the store queue becomes empty before the speculatively issued store operations arrives at the store queue.

10. The processor chip of claim 9, wherein the processor core further comprises:
a speculative store buffer that holds a copy of the speculatively issued store operation; and
wherein said speculative store logic includes logic for:
determining when the store queue is full;
while said store queue is full, speculatively issuing a next store operation to the store queue as a first speculative store operation, wherein the next store operation is issued as a normal, non-speculative store operation when said store queue is not full; and
enabling reissue of the copy of the speculatively issued store operation when the speculatively issued store operation is not accepted by the store queue, wherein the copy is removed from the buffer and re-sent by the processor core to the store queue when the store queue is no longer full.

11. The processor chip of claim 10, wherein said logic for enabling reissue further comprises:
selection logic that selects the copy of said speculatively issued store for reissuing ahead of a normal store operation.

12. The processor chip of claim 11, wherein said selection logic is a speculatively issued store operation selection multiplexer (MUX) having a data input of both said normal issued store operation and the copy of said speculatively issued store operation and a select input that selects the copy of the speculatively issued store whenever that copy is available, wherein the copy is available once the speculatively issued store is not accepted at the store queue.

13. The processor chip of claim 12, wherein said buffer is a first in first out buffer that includes multiple registers that may each hold a copy of a different one of multiple speculatively issued store operations, said speculative store logic further comprising:
logic for determining when a second store operation being issued while the store queue is full targets a different cache line address from a previously issued speculative store operation that was not accepted at the store queue, wherein said second store operation is speculatively issued and a copy of said speculatively issued second store operation is placed in a second register within the store queue; and
logic for reissuing the copies of the speculatively issued stores in the order in which they are placed within the buffer.

14. The processor chip of claim 9, further comprising:
a core interface unit (CIU), which houses the tracking logic and is coupled to said processor core and said store queue via a set of signal wires, including:
a store request wire and a full signal wire connecting said CIU to said processor core;
an entry pop wire;
a store_gathered wire; and
a spec_gathered wire connecting said CIU to logic of said store queue, wherein said spec_gathered wire further connects said store queue logic to said processor core, and wherein the spec gathered wire signals the processor core when a first speculatively-issued store operation gathers into or is assigned an entry in the store queue, wherein the processor core responds by deleting the copy of the first speculatively-issued store from the buffer, wherein said copy of the speculative store operation is not re-issued.

15. The processor chip of claim 9, further comprising a store queue (STQ) controller, wherein said tracking logic is associated with said STQ controller, and said tracking logic is coupled to said processor core via a full signal wire and a spec_gathered wire, said full signal wire and said spec_gathered wire respectively providing said core with a signal including when a store operation is being speculatively issued and when the speculatively issued store operation has been accepted into an entry of the store queue, wherein the processor core responds to a signal on the spec-gathered wire by deleting the copy of the first speculatively-issued store from the buffer, wherein said copy of the speculative store operation is not re-issued.

16. The processor chip of claim 9, wherein said store queue includes control logic and wherein said tracking logic is located within the processor core, said processor chip further comprising an entry pop wire, a store_gathered wire, and a spec_gathered wire interconnecting said store queue control logic and said tracking logic, wherein said tracking logic receives signals via said wires to determine when a store operation is being speculatively issued and when a speculatively issued store operation has been accepted into an entry of said store queue, wherein the processor core responds to a signal on the spec-gathered wire by ignoring the copy of the first speculatively-issued store from the buffer during a subsequent scheduling of a store operation, whereby the first speculatively-issued store operation is discarded and not re-issued.

17. The processor chip of claim 9, further comprising:
entry dispatching logic associated with the store queue for selectively dispatching an entry of said store queue to enable the entry to be re-allocated to a next set of store operations; and
signaling logic associated with said entry dispatch logic for asserting a pop signal to said tracking logic.

18. The processor chip of claim 9, further comprising:
store queue (STQ) controller logic for determining when a store operation has been gathered into or allocated to an entry of said store queue; and
signaling logic that asserts a store_gathered signal for normal store operations that are gathered and a spec_gathered signal for speculatively issued store operations that are gather or allocated to an entry of the store queue.

19. A data processing system comprising:
a processor chip that includes:
a store queue having multiple entries, each entry capable of gathering multiple processor issued store operations targeting a same cache line address, and the store queue is "full" when all entries of the store queue currently holds at least one store operation issued from the processor core;
tracking logic for determining when all the entries within the store queue have been allocated to at least one processor-issued store operation, indicating that the store queue is full; and
a processor core having normal logic for issuing store operations as a normal store when the store queue is not full and speculative store logic for speculatively issuing store operations when the store queue is full; and
a memory hierarchy coupled to said processor chip;
wherein a speculatively issued store operation is scheduled for re-issue to the store queue if the speculatively issued store operation is not gathered by one of the entries within the store queue, and if no entry within the store queue becomes empty before the speculatively issued store operations arrives at the store queue.

20. The data processing system of claim 19, wherein the processor core further comprises:
a speculative store buffer that holds a copy of the speculatively issued store operation; and
wherein said speculative store logic includes logic for:
determining when the store queue is full;
while said store queue is full, speculatively issuing a next store operation to the store queue as a first speculative store operation, wherein the next store operation is issued as a normal, non-speculative store operation when said store queue is not full; and
enabling reissue of the copy of the speculatively issued store operation when the speculatively issued store operation is not accepted by the store queue, wherein the copy is removed from the buffer and re-sent by the processor core to the store queue when the store queue is no longer full.

21. The data processing system of claim 20, wherein said logic for enabling reissue further comprises:
selection logic that selects the copy of said speculatively issued store for reissuing ahead of a normal store operation.

22. The data processing system of claim 21, wherein said selection logic is a speculatively issued store operation selection multiplexer (MUX) having a data input of both said normal issued store operation and the copy of said speculatively issued store operation and a select input that selects the copy of the speculatively issued store whenever that copy is available within the buffer, wherein the copy is available within the buffer once the speculatively issued store is not accepted at the store queue.

23. The data processing system of claim 22, wherein said buffer is a first in first out buffer that includes multiple registers that may each hold a copy of a different one of multiple speculatively issued store operations, said speculative store logic further comprising:
logic for determining when a second store operation being issued while the store queue is full targets a different cache line address from a previously issued speculative store operation that was not accepted at the store queue, wherein said second store operation is speculatively issued and a copy of said speculatively issued second store operation is placed in a second register within the store queue; and
logic for reissuing the copies of the speculatively issued stores in the order in which they are placed within the buffer.

24. The data processing system of claim 20, said processor chip further comprising:
a core interface unit (CIU), which houses the tracking logic and is coupled to said processor core and said store queue via a set of signal wires, including:
a store request wire and a full signal wire connecting said CIU to said processor core;
an entry pop wire, which informs the CIU when an entry of the store queue becomes available for assigning to a next store operation;
a store_gathered wire, which informs the CIU when a normal store operation is gathered into or assigned an entry of the store queue; and
a spec_gathered wire connecting said CIU to logic of said store queue, wherein said spec_gathered wire signals the CIU when a first speculatively-issued store operation gathers into or is assigned an entry in the store queue, wherein the CIU responds by triggering the processor core to initiate a deletion of the copy of the first speculatively-issued store from the buffer.

25. The data processing system of claim 20, said processor chip further comprising a store queue (STQ) controller, wherein said tracking logic is associated with said STQ controller, and said tracking logic is coupled to said processor core via a full signal wire and a spec_gathered wire, said full signal wire and said spec_gathered wire respectively providing said core with a signal indicating when a store operation is being speculatively issued and when the speculatively issued store operation has been accepted into an entry of the store queue, wherein said core responds to a signal on the spec_gathered wire by deleting said first speculative store operation from the buffer, wherein said copy of the speculative store operation is not re-issued.

26. The data processing system of claim 20, wherein said store queue includes control logic and wherein said tracking logic is located within the processor core, said processor chip further comprising an entry pop wire, a store_gathered wire, and a spec_gathered wire interconnecting said store queue control logic and said tracking logic, wherein said tracking logic receives signals via said wires to determine when a store operation is being speculatively issued and when a speculatively issued store operation has been accepted into an entry of said store queue, wherein the processor core responds to a signal on the spec-gathered wire by ignoring the copy of the first speculatively-issued store from the buffer during a subsequent scheduling of a store operation, whereby the first speculatively-issued store is discarded and not re-issued.

27. The data processing system of claim 20, said processor chip further comprising:
entry dispatching logic associated with the store queue for selectively dispatching an entry of said store queue to enable the entry to be re-allocated to a next set of store operations; and
signaling logic associated with said entry dispatch logic for asserting a pop signal to said tracking logic.

28. The data processing system of claim 20, said processor chip further comprising:
store queue (STQ) controller logic for determining when a store operation has been gathered into or allocated to an entry of said store queue; and signaling logic that asserts a store_gathered signal for normal store operations that are gathered and a spec_gathered signal for speculatively issued store operations that are gather or allocated to an entry of the store queue, wherein said core responds to the spec_gathered signal by deleting said first speculative store operation from the buffer, wherein said copy of the speculative store operation is not re-issued.

* * * * *